United States Patent [19]

Matuzawa et al.

[11] Patent Number: 5,312,239
[45] Date of Patent: May 17, 1994

[54] DEVICE FOR FORMING BLISTERS

[75] Inventors: Kouzaburo Matuzawa, Tokyo; Atsushi Fujii, Himeji, both of Japan

[73] Assignees: Matsuzawa Co., Ltd.; Idemitsu Petrochemical Co., Ltd., both of Tokyo, Japan

[21] Appl. No.: 979,594

[22] Filed: Nov. 20, 1992

Related U.S. Application Data

[60] Division of Ser. No. 749,493, Aug. 15, 1991, Pat. No. 5,192,484, which is a continuation of Ser. No. 406,727, Sep. 13, 1989, abandoned.

[30] Foreign Application Priority Data

Sep. 14, 1988 [JP] Japan .................. 63-231578

[51] Int. Cl.⁵ .................. B29C 51/10; B29C 51/22; B29C 51/42
[52] U.S. Cl. .................. 425; 188/74; 188/83; 425/384; 425/388
[58] Field of Search .................. 425/388, 387.1, 214, 425/145, 122, 384; 264/571, 555, 288.4, 291, 292; 188/74, 83

[56] References Cited

U.S. PATENT DOCUMENTS

| | | | |
|---|---|---|---|
| 2,646,081 | 7/1953 | Ritsky | 188/83 |
| 3,268,039 | 8/1966 | Skeen et al. | 188/83 |
| 3,555,127 | 1/1971 | Messer et al. | 425/214 |
| 3,664,915 | 5/1972 | Gore | 264/127 |
| 3,837,782 | 9/1974 | Meissner et al. | 425/388 |
| 3,954,368 | 5/1976 | Kawakami | 425/388 |
| 4,259,286 | 3/1981 | Louis et al. | 264/555 |
| 4,384,441 | 5/1983 | Masuyama et al. | 53/553 |
| 4,515,251 | 5/1985 | Wruk | 188/74 |
| 4,576,669 | 3/1986 | Caputo | 425/388 |
| 4,750,318 | 6/1988 | Matsuzawa | 53/559 |
| 4,889,211 | 12/1989 | Carlson | 188/83 |

FOREIGN PATENT DOCUMENTS

| | | | |
|---|---|---|---|
| 58-126117 | 7/1983 | Japan . | |
| 62-20925 | 1/1987 | Japan | 188/74 |
| 1346878 | 10/1987 | U.S.S.R. | 188/74 |
| 2186927 | 8/1987 | United Kingdom | 188/74 |

Primary Examiner—Khanh Nguyen
Attorney, Agent, or Firm—Flynn, Thiel, Boutell & Tanis

[57] ABSTRACT

A device for forming blisters in which a web material including a thermoplastic resin that is supplied to a rotary forming drum is heated and deformed by heat in accordance with the configuration of cavities provided on the rotary forming drum. A predetermined tension in the range of 5 kg/215 mm to 50 kg/215 mm is applied to the web material while feeding it. When the rotary forming drum consists of a polygonal drum, each peripheral surface of the drum is formed as a curved surface extending along an arc whose radius is larger than that of the circumscribed circle of the polygon. This invention can be used in a packing device for foods, drugs, etc.

1 Claim, 6 Drawing Sheets

DEVICE FOR FORMING BLISTERS

This application is a division of Ser. No. 07/749,493, filed Aug. 15, 1991, now U.S. Pat. No. 5,192,484, which is a continuation of Ser. No. 07/406,727, filed Sep. 13, 1989, now abandoned.

BACKGROUND OF THE INVENTION

1. Field of the Invention

This invention relates to a device for forming blisters which are useful in the blister packing technique used for packing foods, drugs, etc.

2. Description of the Related Art

Recently, polypropylene web materials in the form of sheets, films, etc. have come to be used frequently as a packing material for blister packing, and in particular, for PTP (Push Through Packing) which is mainly used for packing drugs. When using such polypropylene web materials, it is the general practice to adopt a "preheater hot-plate-contact compressed-air system" as the technique for forming blisters. This "preheater hot-plate-contact compressed-air system" employs a forming device which has in its forming section a cavity section having cavities and a compressed-air box facing this cavity section and equipped with plugs. A preheated web material is placed between the cavity section and the compressed-air box, blisters being formed on the web material by means of the plugs and compressed air. In this system, a web material is heated by placing it between hot plates. If the heating temperature is relatively high, various inconveniences may be involved, such as fusion of the web material to the surface of the hot plate, the generation of creases, elongation of the web material due to tension during feeding, and transfer of the surface roughness etc. of the hot plate to the surface of the web material, which will lead to various types of defective formation as well as insufficient transparency of the blisters. Conversely, if the heating temperature is relatively low, the form reproducibility of the forming section will deteriorate. By form reproducibility is meant here the ability to form blisters into a configuration identical to that of the cavities in the forming section. The suitable temperature range is very narrow and therefore, it is necessary to make the hot plate having a high accuracy in a temperature and no temperature difference as to a web material in the plate direction. Besides, in order to stabilize the formation, there is a limit to the type of web material that can be used. That is, the material must have a low softening point and no tendency to melt. The material must be of high uniformity and of high quality. It must exhibit high accuracy in wall thickness, involving no flapping or snaking. In order to overcome these difficulties, a technique (Japanese Patent Laid-Open No. 58-126117) has been proposed according to which cavities are formed in the forming section of a rotary forming drum, suction holes being provided in the non-forming area of the drum, a web material being closely contacted around the peripheral surface of the drum, and the web material fed from the rotary forming drum being heated while receiving a low tension of 0.1 kg/cm from a dancer roll. Since the heating and forming are conducted on the rotary forming drum, it is capable of continuously performing the thermoforming of web materials and that at the same time, since the web material can be wound around the rotary forming drum with a satisfactory tightness, the forming operation can be performed in a stable manner as long as a proper web material is selected by the technique mentioned above.

The problem with the above prior art technique is that the tension applied to the web material by means of the dancer roll is as low as about 0.1 kg/cm, which can lead to defective formation in part since the web material may not adhere to the rotary forming drum in a satisfactory manner, depending on the physical properties (heat expansion, heat contraction, etc.) and other properties (wall-thickness accuracy, flapping, snaking, etc.) of the material.

In some cases, the configuration of the rotary forming drum used for blister formation is made polygonal, e.g., octagonal, so that it may be well suited for the formation of relatively long blisters.

However, a polygonal drum involves the problem that gaps are left between the drum peripheral surface and the web material would around it, so that those sections where no blisters are to be formed are also heated, resulting in creases being generated all over. As a result, the blisters become hard to seal with cover material after they are filled with drugs.

SUMMARY OF THE INVENTION

It is a first object of this invention to provide a device for forming blisters which allows the thermoforming of blisters in an easy and a stable manner regardless of the physical properties and other properties of the web material used.

Another object of this invention is to provide a device for foming blisters which is capable of performing the formation of blisters in a stable manner even when a polygonal rotary forming drum is used.

In order to achieve the above object, the present invention provides a method of forming blisters comprising the steps feeding web material to a rotary forming drum while applying to it a tension in the range of 5 kg/215 mm to 50 kg/215 mm, and heating the web material thus fed to the rotary forming drum, thereby forming blisters.

The blister forming device for executing the above method comprises a rotary forming drum around which a web material consisting of a sheet, film etc. of polypropylene is wound and which has on its outer peripheral surface a forming section for forming blisters, a supply means for supplying the web material to this rotary forming drum, a heating means for heating the web material wound around the above-mentioned rotary forming drum, and a tension-applying mechanism for applying a tension of 5 kg/215 mm to 50 kg/215 mm between the above-mentioned rotary forming drum and the above-mentioned supply means.

In this blister forming device, the above-mentioned tension-applying mechanism may comprise a rubber roll around which the web material is wound and a ring brake having a ring fixed to this rubber roll and a braking rod abutting against this ring and adapted to brake the rubber roll. Alternatively, this tension-applying mechanism may comprise a rubber roll and an axle brake attached to this rubber roll and adapted to brake the rubber roll. It is desirable that the supply tension of the web material be kept constant so that uniform products may be obtained.

The above-mentioned rotary forming drum may have in that portion of its non-forming section which is in contact with the web material a sucking section adapted to fix the web material by sucking it, the above-mentioned forming section being formed as a recess-like cavity which has suction holes for attracting the web material, and the above-mentioned heating means being provided in the vicinity of the outer periphery of the rotary forming drum and over approximately half the periphery of the rotary forming drum. It is to be noted that the supply tension of the web material should not fluctuate, and that the non-formed section of the web material on the rotary forming drum should not be elongated or contracted, or softened by heating.

With the device of the present invention thus constructed, the web material is supplied from the supply means to the rotary forming drum, the web material being transferred by the rotary forming drum as it is kept in contact with the outer peripheral surface of the drum. The tension-applying mechanism applies a tension of 5 kg/215 mm to 50 kg/215 mm to that portion of the web material which is between the rotary forming drum and the supply means, thereby allowing the web material to adhere closely to the outer peripheral surface of the rotary forming drum in a uniform fashion. When, in this condition, the web material is heated by the heating means, pockets which have a configuration corresponding to that of the cavities are formed on the web material.

If the tension applied to the web material is less than 5 kg/215 mm, the adhesion of the web material to the rotary forming drum will be insufficient and the web material consigned to the drum will receive partial heating, separate from it due to the heat expansion, to thereby cause a defective forming thereof. If, on the other hand, the tension exceeds 50 kg/215 mm, the web material will be elongated before forming, and therefore, after-shrinkage becomes large so that the deformation and curl occur in the portion to be formed. Thus, it is necessary to limit the tension to the range of 5 kg/215 mm to 50 kg/215 mm before the above object can be attained.

When the tension-applying mechanism is composed of a rubber roll and a ring brake, tension is applied to the web material by braking the rubber roll around which the web material is wound by means of the ring brake. When the tension-applying mechanism is composed of a rubber roll and an axle brake, tension is applied to the web material by braking the axle section of the rubber roll by means of the axle brake.

As stated above, the rotary forming drum may have in that portion of its non-forming section which is in contact with the web material a sucking section for fixing the web material by sucking it, the above-mentioned forming section being formed as cavities which have suction holes for attracting the web material, and the above-mentioned heating means being formed in the vicinity of the outer periphery of the rotary forming drum and over approximately half the periphery of the rotary forming drum. With this construction, the web material is fixed in position by means of the sucking section formed in the non-forming section of the rotary forming drum and is heated by the heating means over approximately half the periphery of the rotary forming drum while being kept closely adhered to the drum. The heated web material is sucked by the suction holes in the cavities, thereby forming on the web material blisters having a configuration corresponding to that of the cavities.

In order to attain the second object, the blister forming device of this invention is equipped with a rotary forming drum which is so designed that a heated web material consisting of a thermoplastic resin is sucked while being transferred so as to form a plurality of blisters. This rotary forming drum is formed as a polygonal drum having a plurality of planes, each plane being formed as a curved surface whose radius is larger than that of the circumscribed circle of the polygon.

This structure allows the web material to closely adhere to each plane of the drum in spite of its polygonal configuration, thereby making it possible to form relatively long blisters along the mechanical direction of the web material.

BRIEF DESCRIPTION OF THE DRAWINGS

FIGS. 1 to 4 show a first embodiment of this invention, of which:

FIG. 1 is a schematic diagram showing a blister forming device to which the blister forming method of the first embodiment is applied;

FIG. 2 is an exploded perspective view of the rotary forming drum of the blister forming device, showing the drum body and the side-plate member;

FIG. 3 is a front elevational view of a cavity;

FIG. 4 is a sectional view taken along the line IV—IV and in the direction indicated by the arrows of FIG. 3;

DETAILED DESCRIPTION OF THE PREFERRED EMBODIMENT

Figure 1:
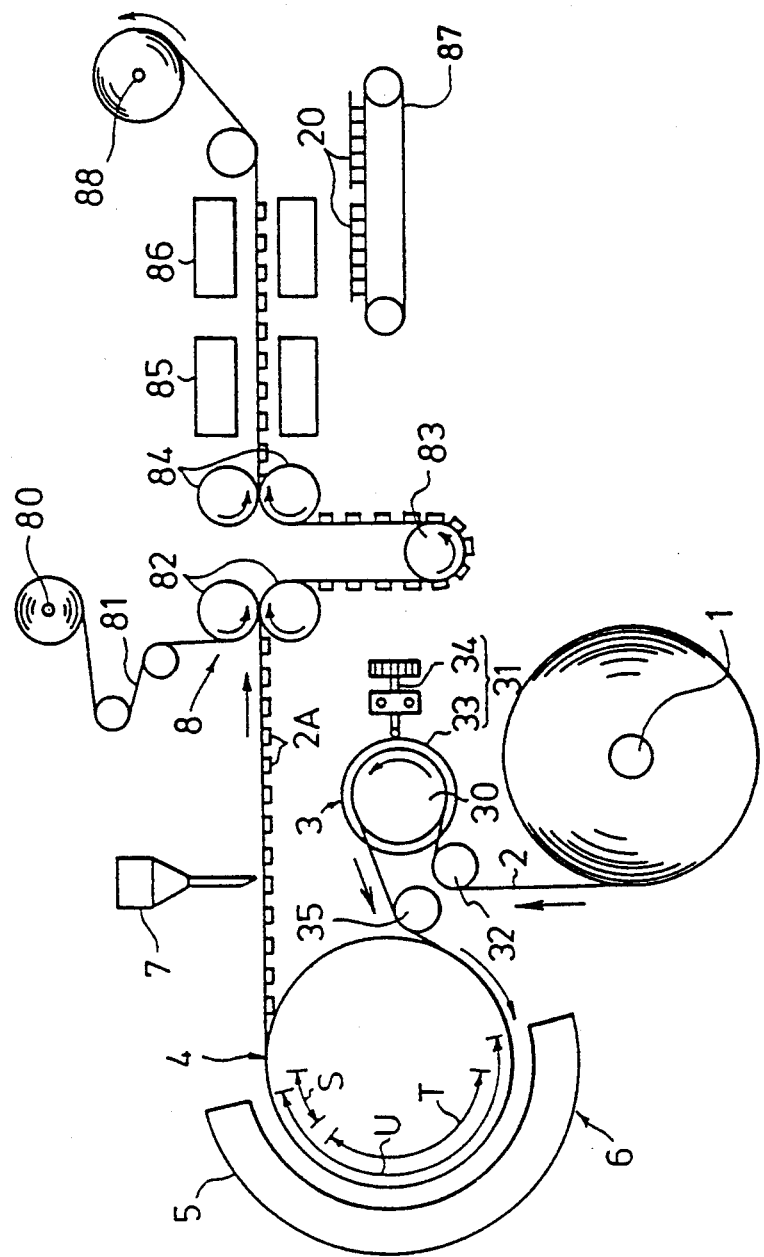

Embodiments of this invention will now be described with reference to the accompanying drawings. Those components which are substantially common to the embodiments will be referred to by the same reference numerals; the description of such components will not be repeated, or will be repeated only in a simplified form.

The blister forming device shown in FIG. 1 includes a supply roll 1 serving as the supply means. A web material 2 consisting of a sheet or film of polypropylene and having a thickness of 0.2 to 0.3 mm is wound around the supply roll 1. This web material 2 is fed from the supply roll 1 by way of a tension-applying mechanism 3 to a rotary forming drum 4. Provided in the vicinity of the outer periphery of this rotary forming drum 4 is an infrared heating furnace 5 which extends over approximately half the periphery of the rotary forming drum 4. Thus, the supply roll 1, the tension-applying mechanism 3, the rotary forming drum 4 and the infrared heating furnace 5 form a blister forming device 6 for forming blisters 2A on the web material 2.

Figure 2:
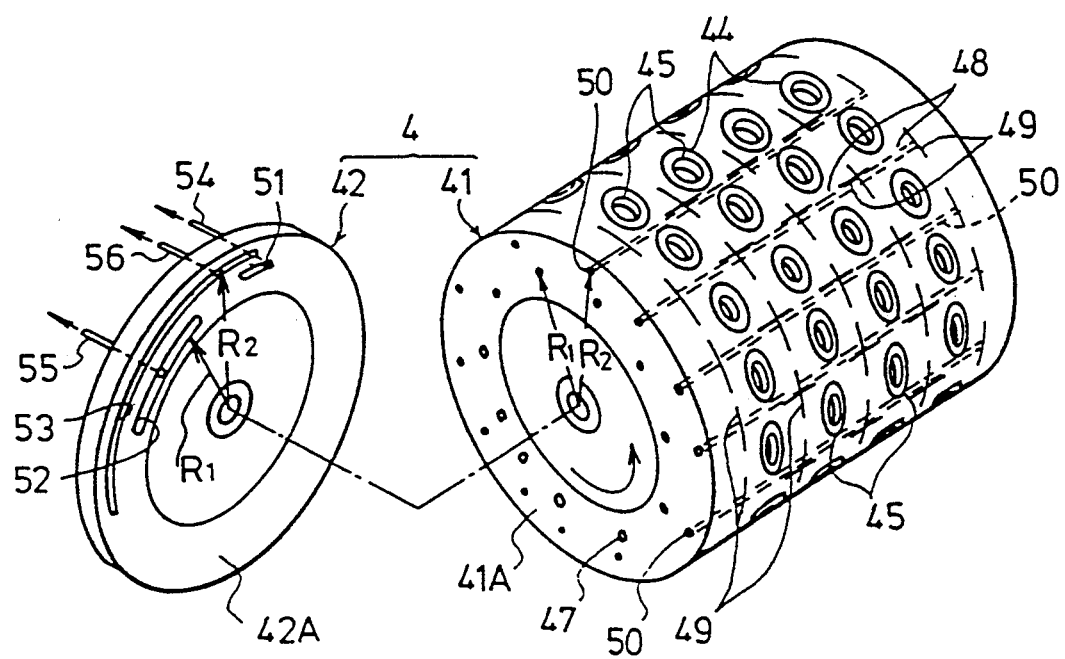

As shown in an enlarged form in FIG. 2, the rotary forming drum 4 is equipped with a cylindrical drum body 41 around which the web material 2 is wound and a disc-like side-plate member 42. The drum body 41 and the side-plate member 42 are supported by an axle (not shown), with their side end surfaces 41A and 42A abutting against each other. The side-plate member 42 is fixed to the axle, whereas the drum body 41 is adapted to rotate while sliding over the side-plate member 42.

Figure 3:
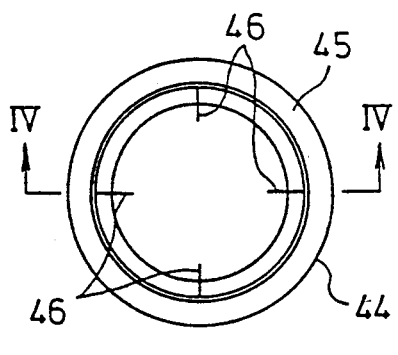
Figure 4:
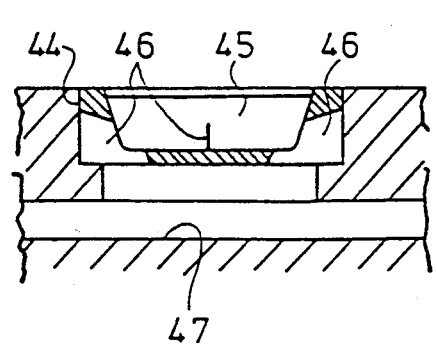

The drum body 41 is cooled by allowing cold water from a water cooler (not shown) to flow through the inner space thereof. The drum body 42 has on its outer peripheral surface a forming section 44 which consists of a plurality of recess-like cavities 45 arranged around the drum periphery as well as in the axial direction. As shown in FIGS. 3 and 4, each of these cavities 45 is equipped with slit-like suction holes 46 adapted to such the web material. These suction holes 46 communicate with suction paths 47 which are provided one for each group of cavities 45 (four in the example shown) arranged in the axial direction. These suction paths 47 have their openings on the side end surface 41A, forming a circle having a radius $R_1$ (see FIG. 2).

As shown in FIG. 2, the drum body 41 has a non-forming area 48 existing among the cavities 45. Formed in this non-forming area 48 are a plurality of slit-like sucking sections 49 having a (+)-like or (−)-like configuration and adapted to fix the web material 2. These sucking sections 49 communicate with a plurality of suction paths 50 extending in the axial direction and provided one for each group of sucking sections 49 arranged in the axial direction. These suction paths 50 have their openings on the side end surface 41A, forming a circle having a radius $R_2 (> R_1)$ Formed on the side end surface 42A of the side-plate member 42 are a first arc-like groove 51 situated at a position corresponding to the radius $R_1$, a second arc-like groove 52 situated at a position corresponding to the radius $R_2$, and a third arc-like groove 53 situated at a position corresponding to the radius $R_3$. The respective lengths of the first, second and third arc-like grooves 51, 52 and 53 are determined such that they correspond to the positions indicated by the arrows S, T and U of FIG. 1, respectively. The first, second and third arc-like grooves 51, 52 and 53 communicate with respective suction pumps (not shown) through pipes 54, 55 and 56, respectively. When the web material 2, adhering to the drum body 41 by being sucked by these suction pumps, is heated by the infrared heating furnace 5, blisters 2A having a configuration corresponding to that of the cavities 45 are formed on the web material 2.

In the example shown in FIG. 1, the tension-applying mechanism 3 is composed of a rubber roll 30 made of silicone rubber and a ring brake 31. The rubber roll 30 is equipped with a rotating mechanism (not shown) such as a motor, and has, on its outer peripheral surface, a multitude of pores for preventing it from slipping over the surface of the web material 2. Provided between the rubber roll 30 and the supply roll 1 as well as between the rubber roll 30 and the rotary forming drum 4 are idle rolls 32 and 35 which are arranged, as shown in FIG. 1, in close proximity to each other, so that the web material 2 can be in contact with the rubber roll 30 over a relatively long range, thereby preventing the web material 2 from slipping. The above-mentioned ring brake 31 is equipped with a ring 33 fixed to the outer periphery of the rubber roll 30 and a braking rod 34 abutting against this ring 33 and adapted to brake the rubber roll 30. The rotation of the rubber roll 30 can be slowed down by adjusting the force with which the braking rod 34 abuts against the ring 33, a tension of 5 kg/215 mm to 50 kg/215 mm ($\approx 0.2$ kg/cm to 2 kg/cm), preferably 10 kg/215 mm to 30 kg/215 mm $\approx 0.4$ kg/cm to 1.2 kg/cm), being applied to the web material 2. In this case, such an arrangement may be adopted that a nip roll is provided on the rubber roll so as to avoid any slip thereof. The reason for placing the range of tension at 5 kg/215 mm to 50 kg/215 mm is that a tension of less than 5 kg/215 mm results in the web material 2 insufficiently adhering to the drum 4, and that a tension exceeding 50 kg/215 mm results in the web material being elongated. Whether the tension applied to the web material 2 is within the above range can be examined by detecting the magnitude of the force applied to the idle roll between the rotary forming drum 4 and the rubber roll 30.

Arranged over the web material 2 transferred from the rotary forming drum 4 is a hopper 7 for supplying contents such as drugs with which the blisters 2A formed on the web material 2 are to be filled.

The web material 2 whose blisters 2A are filled with contents is transferred to a sealing means 8, which is equipped with a cover-material sheet 81 fed by a cover-material supply roller 80 and sealing rollers 82 for heat-sealing the web material 2 with the cover-material sheet 81. After being sealed with the cover-material sheet 81, the web material 2 is transferred through a movable roll 83 and feeding rollers 84 to a perforator 85 and a punching device 86. The perforator 85 is adapted to provide the web material 2 with perforations, and the punching device 86 is adapted to punch out packets 20 constituting predetermined packing units from the web material 2 provided with perforations. The packets 20, punched out by the punching device 86, are conveyed by a conveyer 87, whereas the remnant of the web material 2 is rolled onto a scrap roll 88.

Next, the operation of this embodiment will be described.

The web material 2 fed from the supply roll 1 is transferred, through the idle roll 32, to the tension-applying mechanism 3, and is further transferred, through the idle roll 35, to the rotary forming drum 4.

Upon reaching the rotary forming drum 4, the web material 2 is attracted by and fixed to the drum body 41, over the range U, by the sucking action of the sucking sections 49 in the non-forming area 48, and the drum body 41 rotates in this condition. In the tension-applying mechanism 3, the braking of the rubber roll 30 is effected by allowing the braking rod 34 to abut against the ring 33, a tension of 5 kg/215 mm to 50 kg/215 mm being applied to the web material 2 transferred to the rotary forming drum 4. By the action of the sucking sections 49 and the tension-applying mechanism 3, the web material 2 closely adheres to the drum body 41 in a uniform manner.

In this state, the web material 2 is heated by the infrared heating furnace 5, and sucked, in the ranges T and S, by the suction holes 46 of the cavities 45, whereby blisters 2A are formed on the web material 2.

Afterwards, the blisters 2A of the web material 2 are filled with contents supplied from the hopper 7, and are then sealed with the cover-material sheet 81 by the sealing means 8. After being sealed with the cover-material sheet 81, the web material 2 is provided with perforations by the perforator 85, and is then transferred to the punching device 86, which punches out packets 20.

In the embodiment having the above-described construction, the tension-applying mechanism 3 applies to the web material 2 before it is transferred to the rotary forming drum 4 a tension of 5 kg/215 mm to 50 kg/215 mm, values higher than those in the case where a dancer roller is used. Furthermore, since the web material 2 is retained on the rotary forming drum 4 by the sucking action of the sucking sections 49 formed in the non-forming area 48 of the drum, the web material 2 is heated while being held in close contact with the rotary forming drum 4 in a uniform manner, so that blister can be formed with ease and in a stable manner, regardless of the physical properties and other properties of the web material 2. In addition, since, in this embodiment, the tension-applying mechanism is composed of the rubber roll 30 and the ring brake 31, an appropriate tension can be applied, with a simple construction, to the web material 2. Further, the tension adjustment of the ring brake 31 can be easily performed by means of the braking rod 34.

The following are the results of experiments conducted with a view to verifying the positive effects of this embodiment.

EXPERIMENT CONDITIONS (1) Web material

Material roll A: Idemitsu Pure-Ray Sheet MG-200; thickness: 0.3 mm, width: 215 mm Material roll B: Idemitsu Pure-Ray Sheet MG-400; thickness: 0.3 mm; width: 215 mm (2) Blister packing device Idemitsu MD-550 (indirect-heating-drum vacuum-forming type)

(3) Forming speed: 5 m/min.

Under these conditions, experiments were conducted on Examples 1 to 4 and Comparison Examples 1 to 5 while varying items such as the properties of the material roll, the tension applied, etc., including the decision as to whether or not the web material is to be fixed on the drum surface by means of sucking sections provided in the non-forming area of the drum surface.

fected by the type of web material and the material properties (flapping, snaking). In particular, by heat-forming the web material closely adhering to the rotary forming drum while applying tension thereto, the formation can be satisfactory even if the flapping and snaking are relatively strong. When no drum sheet fixing is effected, the web material may be elongated, which leads to a large shrinkage ratio, resulting in unstable formation. Thus, when no drum sheet fixing is effected, the product is subject to curling or changes in pitch.

Next, a second embodiment of this invention will be described with reference to FIG. 5. The second embodiment differs from the first only in the structure of the tension-applying mechanism 3. Since the other aspects are the same, the drawings and description thereof will be omitted.

Figure 5:
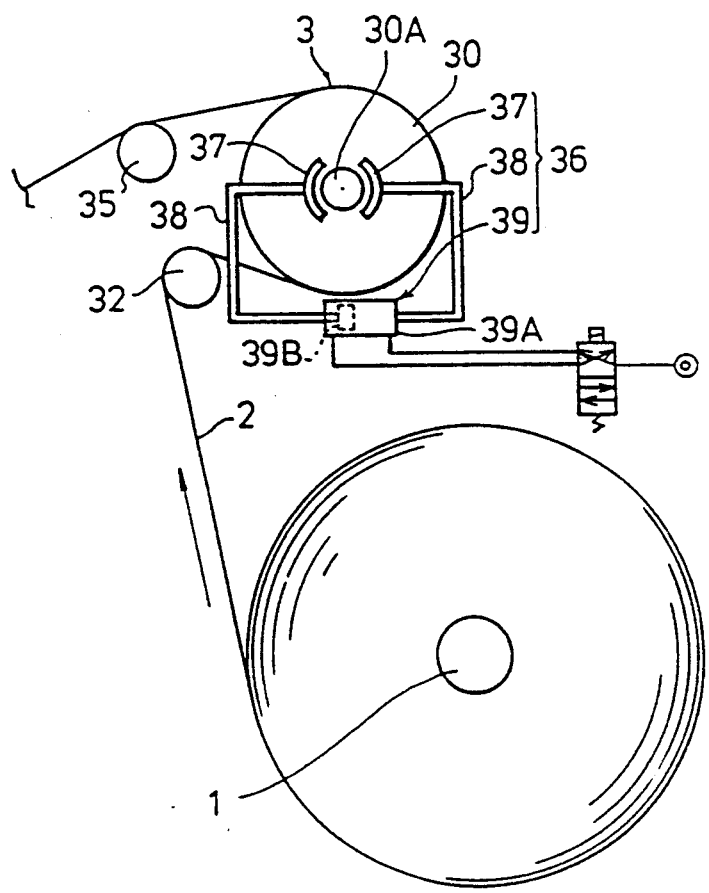
FIG. 5 is a schematic diagram showing the construction of the essential part of a second embodiment of this invention.

As shown in FIG. 5, the tension-applying mechanism 3 of the second embodiment is equipped with a rubber roll 30 and an axle brake 36 attached to the axle 30A of this rubber roll 30. This axle brake 36 includes two U-shaped connecting members 38 and two brake shoes 37 abutting against the axle 30A. One end of each of the connecting members 38 is connected to one of the brake shoes 37. The other ends of the connecting members 38 are connected to the cylinder case 39A and the piston 39B, respectively, on an air cylinder 39. The operation of the air cylinder 39 causes the brake shoes 37 to abut against the axle 30A, thereby braking the axle 30A.

This second embodiment provides the same effects as the first one described above.

The mechanism for braking the rubber roll may also consist of a drum-type brake, a disc-type brake, etc., instead of the ring brake 31 or the axle brake 36. While, in the above-described embodiments, the rubber roll 30 is equipped with a rotating mechanism, it is also possible

TABLE 1

| | Material roll | Properties Flapping | Properties Snaking | Drum Sheet Fixing | Tension | Condition after Formation Sheet-width change | Creases in non-forming area | Pocket reproducibility | Pocket thickness distribution | Shrinkage ratio | MD/TD |
|---|---|---|---|---|---|---|---|---|---|---|---|
| Example 1 | A | 8 | 5 | Effected | 15 kg/215 mm | 0 | None | Satisfactory | Satisfactory | 8/1000 | 11/1000 |
| Comparison Example 1 | ↓ | ↓ | ↓ | Not effected | ↓ | Δ 8 mm | ↓ | ↓ | ↓ | 25/1000 | 10/1000 |
| Comparison Example 2 | ↓ | ↓ | ↓ | Effected | 3 kg/215 mm | 0 | Partly generated | Partly defective | Partly defective | 7/1000 | 11/1000 |
| Example 2 | ↓ | 35 | 20 | Effected | 15 kg 215 mm | 0 | None | Satisfactory | Satisfactory | 7/1000 | 10/1000 |
| Comparison Example 3 | ↓ | ↓ | ↓ | Effected | 0 | 0 | Generated | Defective | Defective | — | — |
| Example 3 | B | 41 | 13 | Effected | 15 kg/215 mm | 0 | None | Satisfactory | Satisfactory | 8/1000 | 10/1000 |
| Comparison Example 4 | ↓ | ↓ | ↓ | Effected | 0 | 0 | Generated | Defective | Defective | — | — |
| Example 4 | ↓ | 5 | 4 | Effected | 7 kg/215 mm | 0 | None | Satisfactory | Partly defective | 7/1000 | 10/1000 |
| Comparison Example 5 | ↓ | ↓ | ↓ | Effected | 0 | 0 | Generated | Defective | Defective | — | — |

Note 1:
Flapping is indicated by the sum total of the flapping heights over the range of 1 m in the MD-direction (see Note 3) of the web material (mm).
Note 2:
Snaking is indicated by the maximum snaking amount over the range of 5 m in the MD-direction of the web material (mm).
Note 3:
"MD-direction" means the direction in which the web material is fed. "TD-direction" means the direction transverse to the MD-direction.
Note 4:
"Drum sheet fixing" means the process of fixing the web material on the rotary forming drum by means of sucking sections provided in the non-forming area of the drum surface.
Note 5:
"Sheet-width change" means elongation of the web material.

As will be appreciated from the experiment results, by applying to the web material a tension of 7 kg/215 mm or 15 kg/215 mm, the formation of blisters can be performed in a satisfactory manner without being affected by the type of web material and the material to eliminate the rotating mechanism from the rubber roll 30, which will then serve as a free roll.

The configuration of the suction holes 45 in the cavities and that of the sucking sections 49 in the non-forming area 48 are not restricted to the slit-like one. They may also be other types of holes including round ones.

It is not always necessary to provide sucking sections 49 in the non-forming area 48 of the rotary forming drum 4. However, providing sucking sections 49 as in the above embodiment is certainly advantageous in that they allow the web material 2 to closely adhere to the rotary forming drum 4 in a more reliable manner.

Figure 6:
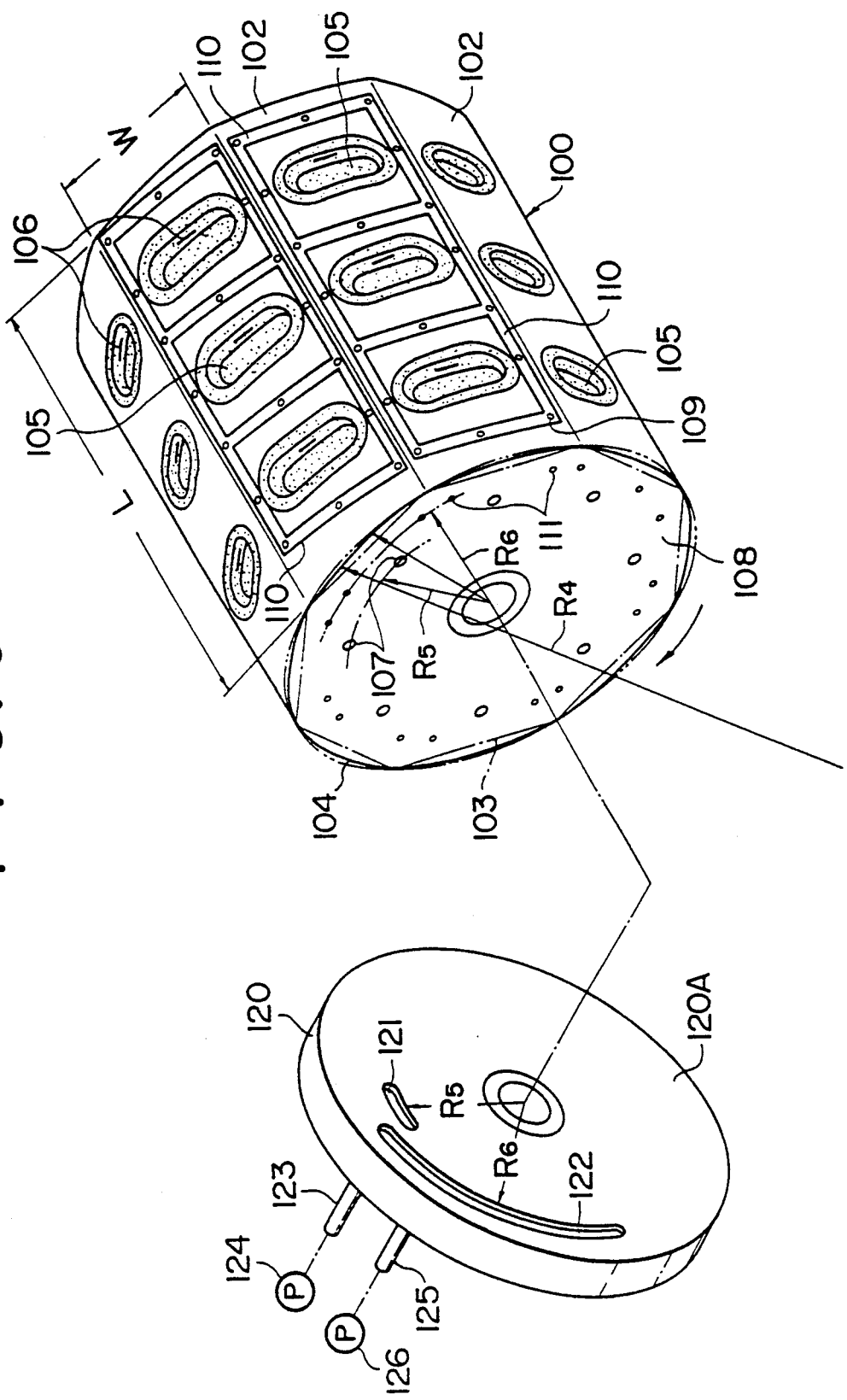
FIG. 6 is a perspective view showing the essential part of a third embodiment of the blister forming device.

Next, a third embodiment of this invention will be described with reference to FIGS. 6 to 9. As shown in FIG. 6, this embodiment is characterized in that the rotary forming drum 100 has a polygonal configuration. In the example shown, the rotary forming drum 100 has an octagonal configuration, encircled by a circumscribed circle 104 indicated by the two-dot chain line and having a radius $R_3$, which may be, for example, 125 mm.

Each peripheral surface 102 is not formed as a flat surface but constitutes a curved surface extending, in the direction of the width W, along an arc whose radius $R_4$ is several times larger than the above-mentioned $R_3$, e.g., 430 mm. The radius $R_4$ of this arc is determined such that curving of the blisters is effected within a permissible range and that the web material is allowed to adhere closely to the surface of the drum. The radius $R_4$ is appropriately determined in accordance with the diameter of the rotary forming drum 100, the number of peripheral surfaces of the polygonal drum, the configuration of the blisters, etc. Normally, it is determined to be 2 to 6 times, preferably 3 to 5 times, larger than the radius of the circumscribed circle.

The reference numeral 103 indicates an octagon encircled by the circle 104 and is indicated by the one-dot chain line. As will be appreciated from this representation, the surfaces 102 are not flat but curved surfaces.

The cavities 105 are formed by cavity parts made of a material having a low heat conductivity, e.g., a polyimide resin. These cavity parts, forming 105 and made of a polyimide resin or the like, are embedded in the rotary forming drum 100. Slit-like suction holes 106 are formed in the side walls of each cavity 105. Each cavity 105 extends over the entire width W of the surface 102.

The cavities 105 are arranged on the surfaces 102 and communicate, through the suction holes 106, with suction paths 107 extending in the axial direction of the rotary forming drum 100. The suction paths 106 are provided one for each group of cavities 105 arranged on each surface 102. The suction paths 107 have their openings on the side end surface 108 of the rotary forming drum 100, forming a circle having a radius $R_5$.

A multitude of suction holes 109 for sucking the web material 2 are formed between adjacent cavities 105 on the surfaces 102 of the rotary forming drum 100. The reference numeral 110 indicates grooves which are formed on the peripheral surface of the rotary forming drum 100 in such a manner as to connect the suction holes 109 to each other.

The suction holes 109 communicate with suction paths 111 provided within the rotary forming drum 100. The openings of the suction paths 111 are arranged on the side end surface 108 of the drum, along a circle having a radius $R_6$ ($\neq R_5$, $> R_5$).

The reference numeral 120 in FIG. 6 indicates a side-plate member including a side surface 120A. Formed on the side surface 120A are a groove 121 extending along an arc having a radius $R_5$ and a groove 122 extending along an arc having a radius $R_6$.

Connected to the groove 121 is a pipe 123, to which a pump 124 is connected.

The groove 122 is connected to a pipe 125, which is connected to a pump 126.

In the above construction, the rotary forming drum 100 rotates, and the web material 2 is supplied from the supply means 1 and adheres closely to the drum peripheral surface, the web material being fed continuously while being heated by the heating furnace 5.

When the rotary forming drum attains the position H (see FIG. 7) in which a suction path 107 faces the groove 121, sucking is effected, thereby forming blisters 2A on the web material 2.

Closely observed, the blisters 2A thus formed exhibit a curve corresponding to a curvature with a radius $R_4$. The curvature, however, is negligible since the ratios $R_4$ is quite large.

The suction of the web material 2 is effected in the section I-H corresponding to the groove 122.

Figure 7:
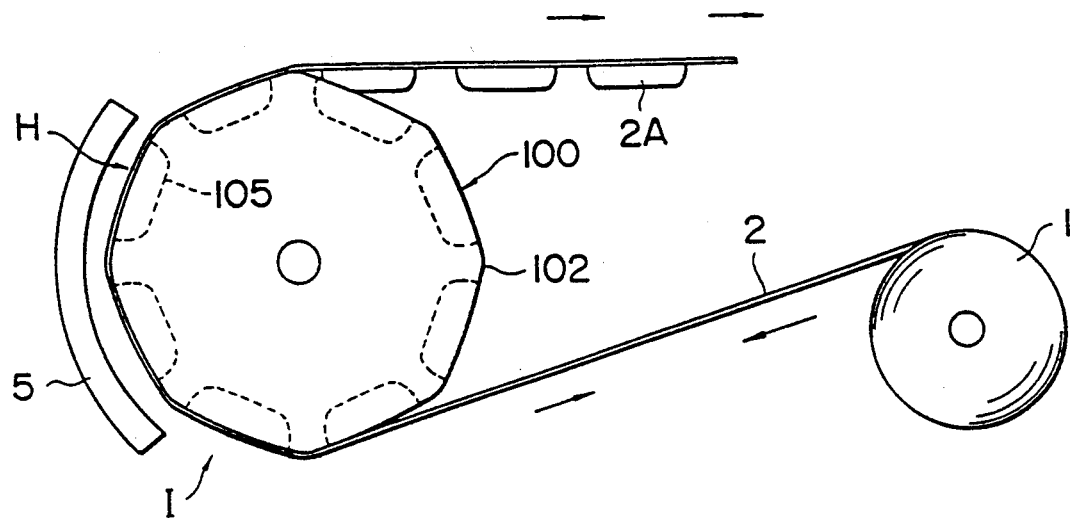
FIG. 7 is a diagram showing how blisters are formed by means of the forming device shown in FIG. 6.
Figure 8:
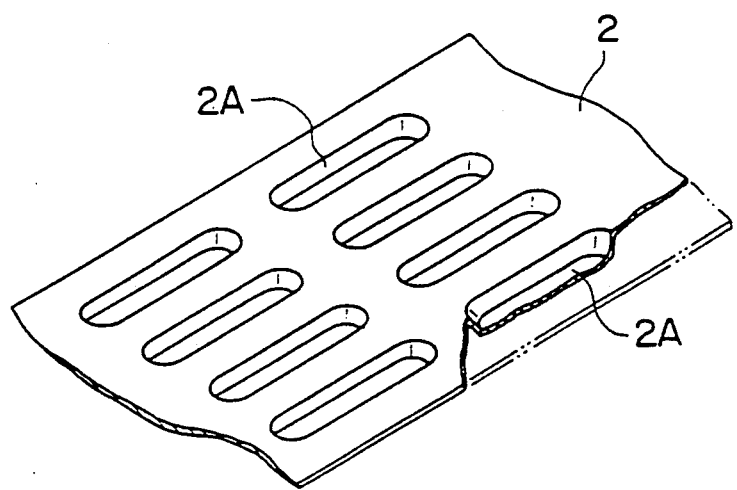
FIG. 8 is a perspective view showing examples of the blisters formed.
Figure 9:
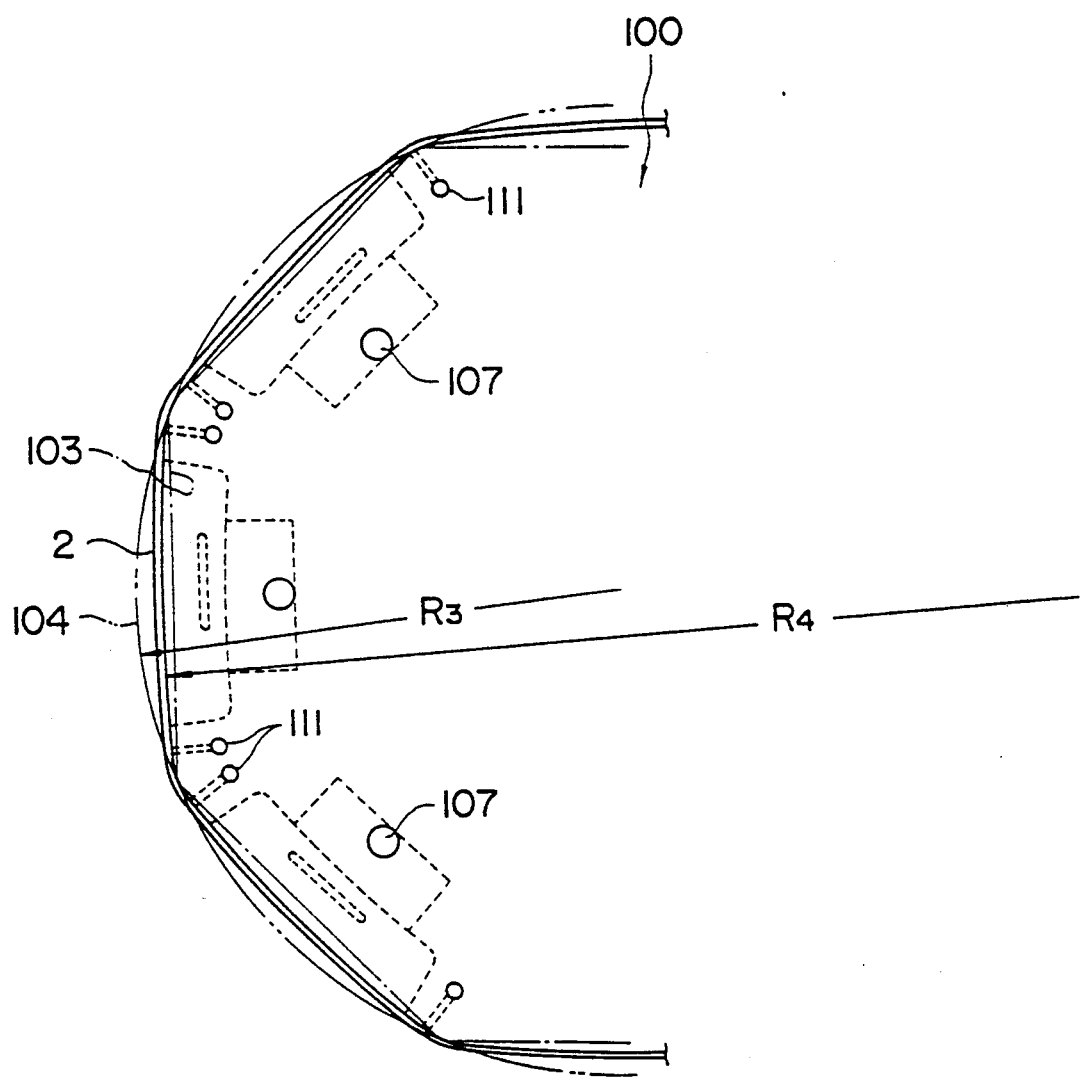
FIG. 9 is a diagram showing the condition in which the web material is in close contact with the rotary forming drum.

Each surface 102 is slightly convex on the outside. As shown in FIGS. 7 and 9, the web material 2 is in close contact with surfaces 102 of the rotary forming drum 100, and is fed while retaining this condition, without any gaps between it and the surfaces 102.

Thus, when the web material 2 is transferred while being heated by the heating furnace 5, heat is also applied to those portions of the web material 2 which do not face the cavities. However, since cooling water is flowing through the rotary forming drum 100, these portions are not heated at all and are reliably kept in a uniformly cooled state. Thus, only those portions of the web material 2 which cover the cavities 105, i.e., the sections where blisters 2A are formed, are heated.

As a result, those portions of the web material 2 where no blisters 2A are formed are not affected by heating and retain their original flat configuration. Accordingly, no creases are generated in these portions, thus avoiding the conventionally experienced problem in the sealing process, which constitutes the last stage of the forming operation.

The simplest possible polygon that can be adopted for the configuration of the rotary forming drum is the quadrangle. The fewer angles, the larger can be the size of blisters.

It is also possible to adopt other configurations for the blisters 2A than that of the above embodiment.

The radius of the arc along which the surfaces extend will be sufficient if it is several times larger than the radius of the circumscribed circle of the drum.

The web material for blister formation may be a synthetic resin other than polypropylene, such as vinyl chloride.

As described above, the method of and the device for forming blisters in accordance with this invention allows blisters to be formed with ease and in a stable manner regardless of the physical properties and other properties of the web material used.

What is claimed is:

1. A device for forming blisters comprising: a rotary forming drum around which a polypropylene web material is wound, said rotary forming drum having an outer peripheral surface which comprises a forming section for forming blisters and a nonforming area, said forming section having a plurality of cavities provided therein with suction holes in said cavities connecting said cavities to a vacuum source, said nonforming area having a plurality of suction holes provided therein connecting said nonforming area to a vacuum source; a supply means for supplying the web material to the rotary forming drum; a heating means for heating the web material wound around the rotary forming drum, said heating means being provided adjacent the outer periphery of the rotary forming drum and extending over about half the periphery thereof; and a tension-applying mechanism for applying a tension of 5 kg/215 mm to 50 kg/215 mm to said web extending between said rotary forming drum and said supply means, said tension-applying mechanism comprising a rubber roll in contact with said polypropylene web material, a ring affixed to the outer periphery of the rubber roll and a braking rod for braking the rubber roll by engaging with the ring.

* * * * *